Dec. 22, 1964  I. V. ZOZULIN  3,162,783
ARMATURE FOR EDDY CURRENT MAGNETIC DRIVES
Filed Aug. 29, 1960  2 Sheets-Sheet 1
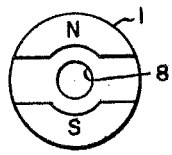
Fig. 1.
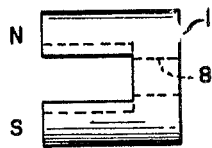
Fig. 2.
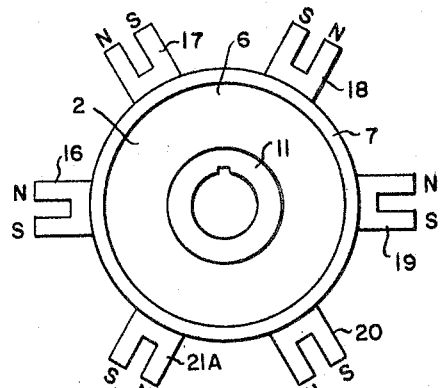
Fig. 4.
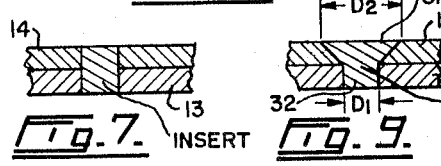
Fig. 7.  Fig. 9.
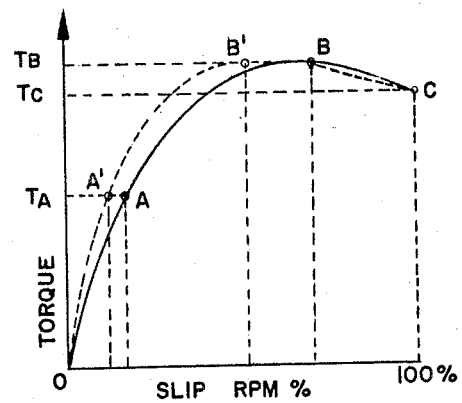
Fig. 10.
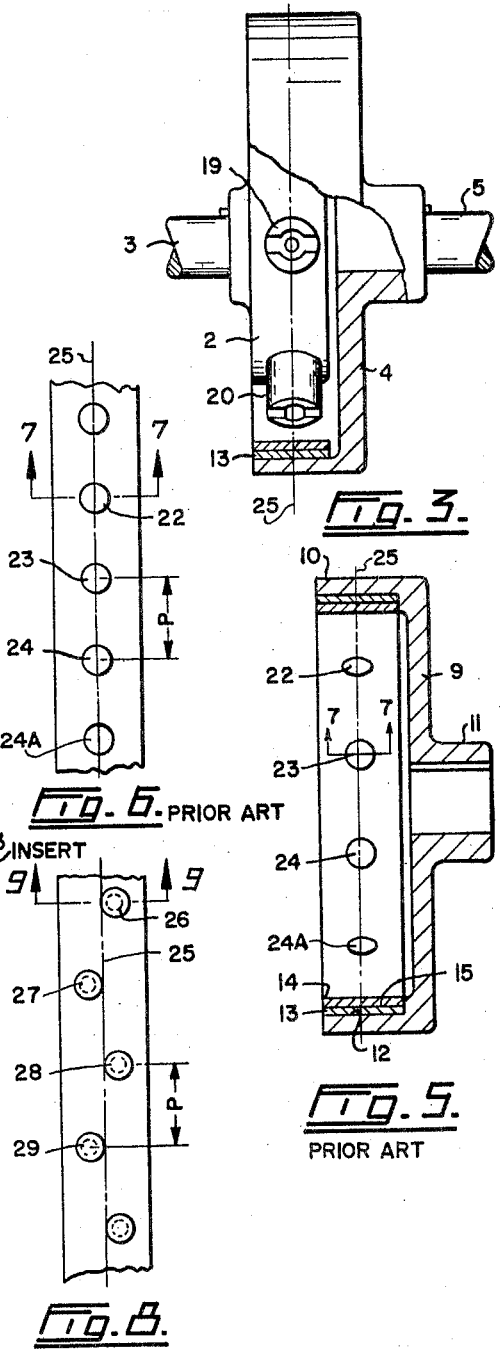
Fig. 3.
Fig. 6. PRIOR ART
Fig. 8.
Fig. 5.
PRIOR ART
INVENTOR
IGOR V. ZOZULIN

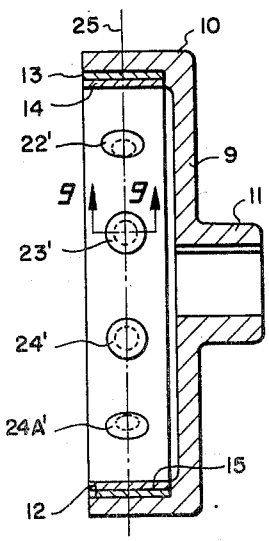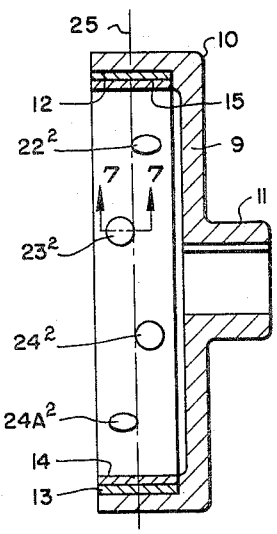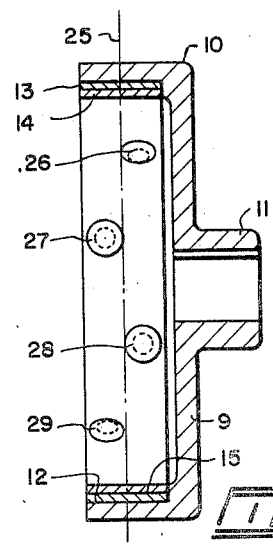

United States Patent Office 3,162,783
Patented Dec. 22, 1964

3,162,783
ARMATURE FOR EDDY CURRENT MAGNETIC DRIVES
Igor V. Zozulin, Vancouver, British Columbia, Canada, assignor to Tormag Transmissions Limited, Vancouver, British Columbia, Canada, a corporation of British Columbia
Filed Aug. 29, 1960, Ser. No. 52,663
7 Claims. (Cl. 310—105)

The invention relates to drives generally described as being of the permanent magnet eddy current type. Such a drive comprises two operative elements, the driving rotor which may be directly attached to the shaft of a prime mover such as an induction motor, and the driven rotor coupled to the load.

One rotor, known as the magnetic rotor, consists of a plurality of permanent magnets suitably mounted on an annulus, or on a short cylinder, so that in rotation the pole faces of said magnets define a surface of revolution.

The magnetic element cooperates with an armature of suitable physical form, the axis of which may be colineal with the axis of the magnetic rotor.

One form of rotating armature comprises a rotating drum having a member of magnetic material, suitably soft iron, to which is rigidly attached a member of non-magnetic material of high electrical conductivity, suitably copper, which latter member is separated from the aforesaid surface of revolution of the magnetic pole faces by a small air gap. Such an armature is commonly referred to as a bimetallic armature, or bimetallic.

The prior art teaches that it is advantageous to provide inserts in the copper member of said bimetallic, which inserts are suitably of the same material as that of the remaining member thereof.

The invention relates to improvements in the bimetallic armature related in particular to the shape, size, and disposition, of the said inserts, directed to increase the capacity and the efficiency of such drives. A preferred embodiment is described in the following specification, and is illustrated by the drawings, in which:

FIGURE 1 is a plan view of a conventional U-cylindrical permanent magnet.

FIGURE 2 is a side elevation of the magnet of FIGURE 1. (FIGURES 1 and 2 are at enlarged scale.)

FIGURE 3 is an elevation, partly sectioned, of a typical magnetic drive.

FIGURE 4 shows the magnetic rotor of the drive in plan.

FIGURE 5 shows, in sectional elevation, an armature rotor, having inserts according to the previous art.

FIGURE 6 is a developed view of the bimetallic of FIGURE 5, showing the inserts.

FIGURE 7 is an enlarged section along line 7—7 of FIGURES 5, 6 and 12.

FIGURE 8 is a view similar to FIGURE 6 above, showing insert arrangement modified according to the subject invention.

FIGURE 9 is an enlarged section on the line 9—9 of FIGURES 8, 11, and 13, showing a truncated conical insert of the present invention.

FIGURE 10 is torque slip characteristic curves.

FIGURE 11 shows an improved armature having aligned truncated conical inserts.

FIGURE 12 shows an improved armature having inserts according to the previous art, which inserts are symmetrically displaced.

FIGURE 13 shows the preferred embodiments of the invention wherein truncated conical inserts are symmetrically displaced.

FIGURES 1 and 2 show in plan and elevation a conventional U-cylindrical magnet, suitably of a special alloy of high retentivity, remanence, and coercive force. One of such special alloys is known as Alnico V.

FIGURE 3 is a magnetic drive of the cylindical type, having aligned shafts. It consists of a magnetic rotor 2 keyed to a shaft 3, and cooperating armature rotor 4 keyed to shaft 5. Suitably the armature rotor is the driving rotor, when shaft 5 may be the output shaft of the prime mover. In this arrangement, the magnetic rotor shaft 3 may be directly connected to the load by conventional means. It is to be understood that shafts 3 and 5 are suitably journalled so that the cooperating rotors are held in the relative positions shown.

The magnetic rotor, FIGURE 4, comprises a drum 6 of non-magnetic material, suitably aluminum adapted to be keyed to a shaft.

The drum 6 is provided with a rim 7 to which are attached a plurality of magnets 16 through 21A, which magnets are of the kind described. Attachment to said rim is by bolt means (not shown) passing through the holes 8, see FIGURES 1 and 2, of each said magnet, and engaging the rim 7. Pole orientation is a shown, viz. N S S N etc., like poles being adjacent. This requirement results in the use of an even number of such magnets, preferably uniformly spaced. For simplicity FIGURE 4 shows six magnets only. Ordinarily more are used up to the limit, circular pitch equals about twice the diameter of the magnet, subject however always to the requirement that the number of magnets be even.

The cooperating armature rotor FIGURE 5 comprises the drum 9 having a rim 10 and hub 11 adapted to be secured, as by keying, to its shaft 5. The inner periphery of rim 10 is machined as indicated by the numeral 12.

The numeral 13 idicates a short thin cylinder of magnetic material, suitably soft iron, the inner surface of which is machined as shown at 15, and having a number of holes drilled therein in which are inserted suitable short sections of soft iron rod of length somewhat in excess of the combined thickness of the bimetallic 13, 14. Inserts as described are indicated by the numerals 22–23A in FIGURE 5 and are pressed, screwed, or otherwise obviously secured in the member 13. The member 13 with said rod sections secured thereto and protruding therefrom, is now electro plated with copper to suitable thickness, to form the member 14.

The resultant composite member consisting of 13, rods such as 22–24A, and the deposited copper 14, is now turned down internally to suitable size, and externally to a shrink fit to the machined inner periphery 12 of the rim 10 aforesaid, and shrunk on.

Thus there is formed the armature rotor comprising the drum 9, to the flange 10 of which is rigidly fixed the bimetallic member 13, 14; having inserts in the copper element 14 thereof.

Said inserts are, as shown in FIGURE 5, positioned centrally in the bimetallic member 13, 14 so that in the assembled drive they are central with respect to the pole faces of the magnets 16 through 21A. I refer to inserts arranged in this manner as aligned. The bimetallic elements and inserts described comprise an armature according to the previous art.

Referring now to FIGURES 6 and 8, previously the inserts, as FIGURE 6, were aligned having their centres along a line 25, which may be taken as the trace of the plane of revolution defined by the axes of the rotating magnets 16 through 21A.

I have found that by displacing said inserts, for example, alternately to either side of the trace 25, to produce the arrangement shown in FIGURE 8, an improved operating characteristic is attained. The circular pitch, P, of the inserts being according to the previous art, I have found that any pattern symmetrical about 25, being other than the lineal arrangement of FIGURE 6, produces similar improvement.

Referring now to FIGURE 9, I have found that by making the dimension $D_2$ of that part of the insert adjacent the magnetic pole faces aforesaid, to be substantially greater than the shank dimension $D_1$, maintaining however the aligned arrangement illustrated in FIGURE 6, there is also improvement in the operating characteristic. The insert 26 as illustrated in FIGURE 9 is seen to comprise a truncated conical portion 31, and a shank portion 32. The effects described above result from the portion 31. Shank 32 is one convenient means of obtaining the required construction. The insert 26 may consist only of the portion 31 obviously inserted in the member 14, and in such case holes would not be drilled, as previously described, in the member 13.

Previously discovered advantages, resulting from the use of inserts as described, reduce when said inserts are made large. In the limiting case, the bimetallic copper-soft iron armature has a characteristic approaching that of an armature composed of iron only. I have found that there is a relation between the size of an insert, as at $D_2$, and the total area of the two pole faces of a co-operating U-cylindrical magnet plus the air gap therebetween, and that in practice satisfactory results are obtained when the area at $D_2$ is about one quarter of the said total area.

Size at $D_2$ being such as to fulfill the foregoing condition the ratio, $D_2/D_1$ is not critical, there is little increase beyond the value 1.4, giving an area ratio of about 2 to 1, and I have found that the major part of the gain is realized with end area ratio in excess of 1.5 to 1. It is not necessary that an insert be circular in section, it may be oval, rectangular, or any of other convenient form provided the ratio $D_2/D_1$ above is maintained.

Further, I have found these effects to be additive. That is to say the displaced arrangements, one of which is illustrated in FIGURE 8, result in two-fold improvement in characteristic when the inserts thereof are as shown in FIGURE 9.

The effects are illustrated in the torque slip curves, FIGURE 10. A typical characteristic of an eddy current drive according to the previous art, and having inserts as shown in FIGURE 6, is given by the curve ABC.

Point A is the running condition at designed normal load and the torque at A, $T_A$ is such that the power required from the prime mover is not greater than the continuous load rating of that prime mover. The drive runs at the slip indicated by the X-ordinate of A, and efficiency is $(100-S_A)\%$, where $S_A$ is slip at A. The r.p.m. of the driven rotor is $(100-S_A)\% \times$ r.p.m. of driving rotor.

As the load on the output shaft is increased beyond A, slip increases (that is, output r.p.m. reduces) and torque increases until, at point B, maximum torque is attained. This is the greatest torque that can be transmitted by the particular drive. Further small increase in load will reduce output r.p.m. (increasing slip) and will reduce the torque, consequently—the external load being maintained in excess of that required to produce $T_B$—the output shaft will slow, to stall at point C at which point slip is 100%.

The torque at point C is designed to be such that the prime mover may run indefinitely at this load without harm. After having stalled, the driven rotor will restart when, and only when, torque is reduced to a value less than $T_C$. This will reduce the slip r.p.m. and increase the torque—going backwards along the curve to point A to reach normal running condition again.

Thus the drive having characteristic ABC FIGURE 10 has the normal load capacity:

$$\frac{T_A \times RPM_4 \times (100-S_A)\%}{33,000} \text{ H.P.}$$

where $RPM_4$ is the r.p.m. of the driving rotor.

At this load the efficiency is $$(100-S_A)\%$$

The maximum torque that the drive can transmit is $T_B$, and the torque with stalled output is $T_C$, $T_C$ being less than $T_B$ but greater than $T_A$, as otherwise the stalled drive would restart at normal load as described above.

At stalled output, the input power is $$\frac{T_C \times RPM_4}{33,000} \text{ H.P.}$$

at which condition all this power is absorbed by the drive and transformed to heat, originating in the bimetallic armature 13, 14.

For this reason it is preferred to have the armature rotor the driver, since at stall the driver continues to rotate, thus there is opportunity to provide means of heat dissipation.

When the prime mover, suitably an induction motor, operating such a drive is of capacity not less than indicated by the foregoing, it is seen that full overload protection is given by the subject drive and that, if stalled by gross overload of any kind, it will restart as has been explained.

The actual torque developed at A, B, C, is a matter of design being a function of factors such as, the number and kind, and weight, of magnets, the diameter of the rotor, and the thickness of the bimetallic ring 13, 14. For example, if $T_A$ be given the value 100, $T_B$ may be 140 and $T_C$ 110—according to the requirement.

In these circumstances the slip at point A is of particular importance, since this determines capacity and efficiency. The capacity at which a particular drive is rated is a compromise with efficiency, capacity increases and efficiency reduces as point A, following the solid curve of FIGURE 10, is moved to the right.

Referring still to FIGURE 10, the accomplishment of the invention may now be stated in specific terms to be, materially to steepen the initial portion of the curve ABC, without changing major design parameters. This will increase the capacity of a given drive operating at the same efficiency, or alternatively will increase the efficiency of a given drive if operated at the same capacity. These effects are illustrated by the broken line curve $A^1B^1C$.

The use either of truncated conical insets as FIGURE 9, or of conventional inserts in a symmetrically displaced arrangement such as FIGURE 8, moves point A to the left toward $A^1$. Where insets so modified are employed in a non-aligned arrangement such as described, then the combined effect is to move point A to point $A^1$ with the advantages described.

FIGURES 11, 12, 13 illustrate armature embodiments in which the advantages above are attained.

FIGURE 11 shows an armature having inserts $22^1$–$24A^1$ of truncated conical form as shown in FIGURE 9, the inserts themselves being in the aligned arrangement. With such an armature the point A of the characteristic ABC is displaced to the left towards $A^1$.

In FIGURE 12, the inserts themselves, $22^2$–$24A^2$, are according to the previous art but are symmetrically displaced from the centre line 25 which line represents the plane defined by the axes of the magnets of the magnetic rotor. The characteristic of the FIGURE 12 armature is substantially the same as that of the FIGURE 11 armature.

The FIGURE 13 armature has truncated conical rivets 26–29 in a symmetrically displaced arrangement. The characteristic is the broken line curve $A^1B^1C$ of FIGURE 10. This armature having symmetrically displaced truncated conical inserts is the preferred embodiment of my invention.

Any one of the armatures of FIGURES 11–13 may be incorporated in any eddy current magnetic drive such as FIGURE 3.

There have been described above embodiments of my invention in an eddy current magnetic drive of the cylindrical type having but one ring of permanent magnets. The invention is not limited thereto, but may be applied to rotors of different kinds, and having one or several circles of magnets, each with cooperating circles of inserts arranged in a manner analogous to that described, to constant speed and variable speed torque converters of the subject kind, and in such modifications and alternate construction as fall within the spirit and scope of my invention as expressed in the description, illustrated in the drawings, and as set forth in the appended claims.

For example, I find that the effect described as being obtained by virtue of an insert arrangement such as shown in FIGURE 8, can equally be attained with inserts aligned as shown in FIGURE 6, the aligned inserts cooperating with a magnetic rotor having two rows of magnets arranged in manner analogous to that of the inserts of FIGURE 8, that is to say for example in two rows, the magnets of the one row opposite the spaces of the other row.

What I claim as my invention is:

1. An eddy current magnetic drive having as mutually cooperating elements a magnetic rotor and an armature rotor, to comprise in combination:
   (a) a magnetic rotor to which is secured a row of permanent magnets each having two pole faces and an air gap therebetween,
   (b) a bimetallic armature rotor to comprise,
      (i) an element of soft magnetic material
      (ii) secured in contact therewith an element of non-magnetic material of high electrical conductivity having a surface in close spaced relationship to the pole faces aforesaid to cooperate therewith,
   (c) holes in the element (a) (ii), inserts of soft magnetic material to fill said holes,
      (i) said holes and inserts of truncated conical form the larger ends of which are closer to the cooperating pole faces aforesaid.

2. The device as claim 1, having,
   (c) (ii) the area of the larger end of an insert substantially one quarter of the total area of the two pole faces, plus the area of the air gap therebetween, of a cooperating magnet.

3. The device as claim 2, having,
   (c) (iii) the ratio of the larger end of an insert to that of the smaller end thereof greater than 1.5:1.

4. The device as claim 1, any number of said holes and inserts displaced from a position centrally opposite the pole faces aforesaid so as to form a pattern symmetrical with respect to the centres of said magnets.

5. The device as claim 2, any number of said holes and inserts displaced from a position centrally opposite the pole faces aforesaid so as to form a pattern symmetrical with respect to the centres of said magnets.

6. The device as claim 3, any number of said holes and inserts displaced from a position centrally opposite the pole faces aforesaid so as to form a pattern symmetrical with respect to the centres of said magnets.

7. An eddy current magnetic drive having as mutually cooperating elements a magnetic rotor and an armature rotor, to comprise in combination:
   (a) a magnetic rotor to which is secured a row of permanent magnets each having pole faces,
   (b) a bimetallic armature rotor to comprise,
      (i) an element of soft magnetic material
      (ii) secured in contact therewith an element of non-magnetic material of high electrical conductivity having a surface in close spaced relationship to the pole faces aforesaid to cooperate therewith,
   (c) holes in the element of non-magnetic material, inserts of soft magnetic material to fill such holes, any number of said inserts displaced from a position centrally opposite the pole faces aforesaid so as to form a pattern symmetrical with respect to the centres of said magnets.

References Cited by the Examiner
UNITED STATES PATENTS

| | | | |
|---|---|---|---|
| 653,424 | 7/00 | Lunt | 310—105 X |
| 2,769,932 | 11/56 | Zozulin | 310—105 |
| 2,810,349 | 10/57 | Zozulin | 310—105 X |
| 2,842,729 | 7/58 | Hillman | 310—211 X |

FOREIGN PATENTS

| | | |
|---|---|---|
| 866,213 | 4/41 | France. |
| 1,011,094 | 4/52 | France. |

M. O. HIRSHFIELD, *Primary Examiner.*

D. X. SLINEY, *Examiner.*